United States Patent [19]

Kawaguchi et al.

[11] Patent Number: 5,300,332

[45] Date of Patent: Apr. 5, 1994

[54] MELT-STABLE COPOLYESTER RESINS AND MOLDED ARTICLES THEREOF

[75] Inventors: Kuniaki Kawaguchi; Toshio Nakane; Kenji Hijikata, all of Shizuoka, Japan

[73] Assignee: Polyplastics Co., Ltd., Osaka, Japan

[21] Appl. No.: 15,181

[22] Filed: Feb. 11, 1993

[30] Foreign Application Priority Data

Feb. 12, 1992 [JP] Japan ................... 4-025200

[51] Int. Cl.$^5$ .............................................. B32B 1/00
[52] U.S. Cl. .................... 428/34.1; 528/272; 528/274; 528/293; 528/294; 528/298; 528/302; 528/308; 528/308.6; 525/437; 525/444; 525/448; 525/450; 428/364
[58] Field of Search ............... 528/272, 274, 293, 294, 528/298, 302, 308, 308.6; 525/437, 444, 448, 450; 428/34.1, 364

[56] References Cited

U.S. PATENT DOCUMENTS 4,076,783  2/1978  Yasuda et al. ................... 264/78

FOREIGN PATENT DOCUMENTS 0517511 12/1992 European Pat. Off. .
1216988  4/1960 France .

OTHER PUBLICATIONS

Chemical Abstracts, vol. 102, No. 22, 3 Jun. 1985, Columbus, Ohio, US; Abstract No. 186019r.

*Primary Examiner*—John Kight, III
*Assistant Examiner*—Sam A. Acquah
*Attorney, Agent, or Firm*—Nixon & Vanderhye

[57] ABSTRACT

A modified polyester resin is the reaction product of:
(A) an acid component mainly comprised of terephthalic acid, 2,6-naphthalene dicarboxylic acid or a lower alcohol ester thereof,
(B) a diol component mainly comprising an alkylene glycol having 2 to 8 carbon atoms, and
(C) an aromatic sulfonic acid compound of the following general formula (1):

$$HO(RO)_n-Ar-SO_3M \quad (1)$$

where Ar represents a benzene or naphthale ring, n represents an integer from 1 to 10, R represents a group selected from among alkylenes having 2 or 3 carbon atoms and when n is 2 or more, R may be the same as or different from one another, and M represents an alkali metal selected from lithium, sodium and potassium. The modified polyester resin also satisfies the following formulas (2) and (3):

$$0.25 \leq x \leq 100 \text{ (meq/kg)} \quad (2)$$

$$2 \leq (x/CEG) \times 100 \leq 150 \text{ (\%)} \quad (3)$$

where x represents the amount of the aromatic sulfonic acid compound represented by the above general formula (1) introduced thereinto and CEG represents the amount of the carboxy end groups, and x and CEG are each expressed in milliequivalent per kilogram (meq/kg) of the polymer.

10 Claims, No Drawings

MELT-STABLE COPOLYESTER RESINS AND MOLDED ARTICLES THEREOF

FIELD OF INVENTION

The present invention relates generally to modified polyester molding resins and to articles molded therefrom having excellent mechanical properties, such as tenacity. In preferred forms, the modified polyesters of this invention will exhibit melt-stability to an extent that little (if any) decomposition gas and/or decomposition residue (sublimate) are evolved during high temperature use for prolonged time periods (e.g., during molding).

BACKGROUND AND SUMMARY OF THE INVENTION

Polyalkylene terephthalate resins, such as polybutylene terephthalate (hereinafter sometimes referred to by the abbreviation "PBT"), are well known crystalline thermoplastic resins which exhibit excellent mechanical, electrical, chemical and physical properties. As a result, polyalkylene terephthalate resins have been widely used as an engineering plastic in a variety of end-use applications, including component parts for automobiles, electrical and electronic appliances, and the like. PBT is also known to exhibit excellent aroma retention and gas-barrier properties and thus has been used recently as a food and cosmetic packaging material.

However, there exist several problems when polyalkylene terephthalate resins are molded. Significantly, when polyalkylene terephthalate resins are melt-processed, they often decompose and thus generate decomposition gases and/or decomposition residues (sublimate) which adversely affects the surface quality of molded articles (e.g., by formation of voids on the surface) as well as staining/corroding the mold from which the article is made. Such decomposition of polyalkylene terephthalate or polyalkylene naphthalate resins is known to be exacerbated by intermittent (rather than continuous) molding operations which require that the resin be maintained in a molten state for a prolonged time period.

Furthermore, problems associated with polyalkylene terephthalate resins in terms of evolution of a decomposition gas (e.g., tetrahydrofuran) have been experienced when molded articles are used in an environment where the part is exposed to elevated temperatures for prolonged time periods. Accordingly, an electrical or electronic component (such as a relay, switch or connector) which is comprised of an article molded from a conventional polyalkylene resin is problematic in that the evolved decomposition gas will stain or corrode metallic parts of the component (e.g., electrical contacts) and thus reduce the component useful life.

What has been needed therefore is a polyalkylene terephthalate resin composition which is highly melt-stable to an extent whereby evolved decomposition products during melt-processing and/or during which temperature use is significantly minimized (if not eliminated entirely). It is towards fulfilling such a need that the present invention is directed.

According to the present invention, modified polyester resins are provided which emit a minimal amount of decomposition gas (such as tetrahydrofuran) when used at high temperatures for prolonged time periods, as well as a decreased amount of sublimate when in the melt-phase. More specifically, the present invention relates to modified polyester resins which are the reaction product of:

(A) an acid component mainly comprised of terephthalic acid, 2,6-naphthalene dicarboxylic acid or a lower alcohol ester thereof, (B) a diol component mainly comprising an alkylene glycol having 2 to 8 carbon atoms, and (C) an aromatic sulfonic acid compound of the following general formula (1):

$$HO(RO)_n-Ar-SO_3M \qquad (1)$$

wherein Ar represents a benzene or naphthale ring, n represents an integer from 1 to 10, R represents a group selected from among alkylenes having 2 or 3 carbon atoms and when n is 2 or more, R may be the same as or different from one another, and M represents an alkali metal selected from lithium, sodium and potassium.

Most preferably, the modified polyesters of this invention will also satisfy the following formulas (2) and (3):

$$0.25 \leq x \leq 100 (meq/kg) \qquad (2)$$

$$2 \leq (x/CEG) \times 100 \leq 150 \, (\%) \qquad (3)$$

where x represents the amount of the aromatic sulfonic acid compound represented by the above general formula (1) introduced thereinto and CEG represents the amount of the carboxy end groups, and x and CEG are each expressed in milliequivalent per kilogram (meq/kg) of the polymer.

Further aspects and advantages of this invention will become more clear after careful consideration is given to the detailed description of the preferred exemplary embodiments thereof which follow.

DETAILED DESCRIPTION OF THE PREFERRED EXEMPLARY EMBODIMENTS

The polyester of the present invention can be prepared by conducting melt polycondensation of (A) an acid component mainly comprising terephthalic acid, 2,6-naphthalenedicarboxylic acid or a lower alcohol ester thereof with (B) a diol component mainly comprising an alkylene glycol having 2 to 8 carbon atoms in the presence of (C) an aromatic sulfonic acid compound.

Examples of the terephthalic component include those mainly comprised of ethylene terephthalate, ethylene 2,6-naphthalate, 1,3-propylene terephthalate, 1,3-propylene 2,6-naphthalate, 1,4-butylene terephthalate, 1,4-butylene 2,6-naphthalate, cyclohexylenedimethylene terephthalate and/or cyclohexylenedimethylene 2,6-naphthalate repeating units.

Included within the definition above are homopolyesters consisting of only one kind of repeating unit as mentioned previously, as well as copolyesters mainly comprising combinations of such repeating units. Among them, polyesters mainly comprising 1,4-butylene terephthalate and/or 1,4-butylene 2,6-naphthalate as the main repeating units are particularly preferred. Examples of the acid component mainly comprising a lower alcohol ester of terephthalic acid include terephthalic acid and dimethyl esters thereof, while examples of the acid component mainly comprising a lower alcohol ester of 2,6-naphthalenedicarboxylic acid include 2,6-naphthalenedicarboxylic acid and dimethyl esters thereof.

When preparing a copolyester according to the present invention, one or more acid components other than the main acid components described above may additionally be used as acid comonomers. The acid components that may be used as such comonomers include known difunctional acids and lower alcohol esters thereof such as terephthalic, isophthalic, orthophthalic, 2,6-naphthalenedicarboxylic, 2,7-naphthalenedicarboxylic, diphenic, 4,4'-diphenyldicarboxylic, adipic, sebacic and 1,4-cyclohexanedicarboxylic acids and dimethyl esters thereof. Further, one or more diol components other than the main diol components described above may also be additionally used as diol comonomers. The diol components that may be used as comonomers include known difunctional diols such as ethylene glycol, diethylene glycol, triethylene glycol, propanediol, 1,4-butanediol, 1,5-pentanediol, 1,6-hexanediol, neopentyl glycol, 1,10-decanediol, 1,4-cyclohexanedimethanol, 1,4-cyclohexanediol, p-xylylene glycol, adducts of hydroquinone with alkylene oxides, those of 2,2-bis(4-hydroxyphenyl)-propane with alkylene oxides, those of bis-(4-hydroxyphenyl) sulfone with alkylene oxides and those of 2,6-dihydroxynaphthalene with ethylene oxide. Furthermore, halogen-substituted derivatives of these compounds may be used as the comonomers in order to impart flame retardance to the polyester.

The amount of the comonomers to be introduced into the polymer backbone is preferably at most 30 mole %, and more preferably at most 20 mole % based on all the repeating ester units. Moreover, the use of a small amount of an at least trifunctional compound such as trimethyl trimesate, trimethyl trimellitate, trimethylolpropane or pentaerythritol; a monofunctional compound such as stearyl alcohol, methyl o-benzylbenzoate or epoxy compound; a hydroxy carboxylic acid derivative such as methyl p-hydroxyethoxyphenylcarboxylate; or a polyalkylene glycol such as polypropylene glycol or polytetrahydrofuran or the use thereof together with the above comonomer component is permitted in the preparation of the polyester of the present invention.

The modified polyester resin of the present invention is especially characterized by units in its polymer backbone which are derived from (C) an aromatic sulfonic acid compound of the following general formula (1):

$$HO(RO)_n-Ar-SO_3M \qquad (1)$$

wherein Ar represents a benzene or naphthale ring, n represents an integer from 1 to 10, R represents a group selected from among alkylenes having 2 or 3 carbon atoms and when n is 2 or more, R may be the same as or different from one another, and M represents an alkali metal selected from lithium, sodium and potassium.

Specific examples of compounds that may be used as the starting compound include sodium
  4-(2-hydroxythoxy)benzenesulfonate, sodium
  4-(2-hydroxypropoxy)benzenesulfonate, sodium
  4-(2-hydroxyethoxyethoxy)benzenesulfonate, lithium
  4-(2-hydroxyethoxy)benzenesulfonate, potassium
  4-(2-hydroxyethoxy)benzenesulfonate, sodium
  2-(2-hydroxyethoxy)naphthalene-6-sulfonate, sodium
  2-(2-hydroxypropoxy)naphthalene-6-sulfonate, sodium
  2-(2-hydroxyethoxyethoxy)naphthalene-6-sulfonate,
  lithium 2-(2-hydroxyethoxy)naphthalene-6-sulfonate and
  potassium 2-(2-hydroxyethoxy)naphthalene-6-sulfonate.

The above-noted compounds can be prepared by performing the addition reaction of an alkali metal salt of hydroxybenzenesulfonic or hydroxynapthalenesulfonic acid with an alkylene oxide such as ethylene oxide though bond cleavage in the presence of a base or acid catalyst. Alternatively, such compounds may be prepared by reacting ethylene chlorohydrin with an alkali metal salt of hydroxybenzenesulfonic or hydroxynaphthalenesulfonic acid or other process, and the number of repeating oxyalkylene units can be adjusted to either a single value or a plurality of values by controlling the feed and conversion of alkylene oxide.

According to the present invention, the polyester prepared by the melt polymerization must contain one or more compounds represented by the general formula (1) in such an amount as to satisfy the following general formula (2):

$$0.25 \leq x \leq 100 \text{ (meq/kg)} \qquad (2)$$

In the above general formula (2), x is the amount of the aromatic sulfonic acid compound chemically introduced into the polyester and is expressed in milliequivalent per kilogram (meq/kg) of the polyester. It is particularly preferable that x be between 0.5 to 50 meq/kg. The introduction of the sulfonic acid compound in an amount less than 0.25 meq/kg will have little effect in reducing the amount of a gas evolved during long-term use at high temperatures (such as tetrahydrofuran) or the amount of sublimate generated in a molten state. On the other hand, the introduction of the sulfonic acid compound in an amount exceeding 100 meq/kg will result in a polyester having too low a degree of polymerization and therefore exhibiting undesirably poor elongation, tenacity and other mechanical properties.

Although the aromatic sulfonic acid compound represented by the above general formula (1) may be added as desired at any stage in the polymerization process (e.g., from the step of preparing the monomers to be melt-polymerized up to the completion of the melt polymerization), it is particularly preferred that the sulfonic acid compound be added in the first half of the melt polymerization step—i.e. at any stage from the preparation of the monomers up to the completion of the transesterification or esterification (for example, to a diol component such as 1,4-butanediol). It has been ascertained that substantially the entirety of the compound of the formula (1) used can be chemically introduced into the resulting polyester by adding the compound at the preferred stage mentioned above. Alternatively, the aromatic sulfonic acid compound represented by the above general formula (1) may, if necessary, be added in several portions at different stages in the polymerization process.

Adding the sulfonic acid compound to the polyester prepared by melt polymerization and kneading the obtained mixture in an extruder or the like to disperse the compound in the polyester homogeneously is unfavorable because such a procedure necessitates extrusion and kneading steps. In addition, most of the aromatic sulfonic compound of the general formula (1) added would remain intact with the result being that the amount of gas evolved during long-term use at high temperature, such as tetrahydrofuran, or the amount of sublimate generated in a molten state is not significantly reduced.

The transesterification of a lower alcohol ester of terephthalic or 2,6-naphthalenedicarboxylic acid as component (A) with an alkylene glycol having 2 to 8 carbon atoms as component (B) will now be described by taking a case using 1,4-butanediol as the main diol component. The transesterification is conducted by using a lower alcohol ester of terephthalic or 2,6-naphthalenedicarboxylic acid and 1,4-butanediol at a molar ratio of between 1:1 and 1:2 under normal pressure at a temperature of 150° to 230° C. while continuously removing a lower alcohol, such as methanol, that is formed.

Examples of the catalyst that may be used for attaining a practically acceptable reaction rate include titanium compounds, tin compounds, lead oxide, lead acetate, zinc acetate, zinc oxide and manganese acetate, among which organic titanates, titanium tetrachloride and hydrolyzates and alcoholyzates thereof, tin oxide, tin acetate and organotin compounds are preferable. Specific examples of the catalyst include titanium compounds well-known as the catalyst for the preparation of polyesters, such as tetrabutyl titanate, tetrapropyl titanate, tetraethyl titanate, tetramethyl titanate and hydrolyzates thereof; hydrolyzates of titanium tetrachloride and titanium sulfate; inorganic titanium compounds such as potassium fluorotitanate, zinc fluorotitanate and cobalt fluorotitanate; titanium oxalate and potassium titanium oxalate; and tin compounds well-known as the catalyst for the preparation of polyesters, such as dibutyltin oxide, dibutyltin acetate, dioctyltin diacetate, diphenyltin dilaurylmercaptide, polydibutyltin sebacate, dibutyltin ethylene glycolate, dioctyltin thiosalicylate, diphenyltin benzenesulfonate and dimethyltin p-toluensulfonate. Particularly preferable examples thereof include tetrabutyl titanate, tetrapropyl titanate, hydrolyzate of titanium tetrachloride, dibutyltin oxide, dibutyltin acetate and dioctyltin diacetate.

In using the above titanium or tin compound or a mixture of both as the catalyst, the amount of the titanium or tin compound (or the total amount of the mixture) may be 10 to 1000 ppm, preferably 30 to 800 ppm in terms of titanium and/or tin atoms based on the polymer. If necessary, the catalyst may be added during the reaction in several portions.

The esterification of terephthalic or 2,6-naphthalenedicarboxylic acid as component (A) with an alkylene glycol having 2 to 8 carbon atoms as component (B) will now be described by taking a case using 1,4-butanediol as the main diol component. The esterification is conducted by using terephthalic or 2,6-naphthalenedicarboxylic acid and 1,4-butanediol at a molar ratio of between 1:1 and 1:5 under normal or elevated pressure at a temperature of 200° to 250° C. while continuously removing formed water. It is favorable in many cases that esterification be conducted in the presence of a titanium or tin compound as described above.

The polycondensation is conducted by melt-polymerizing the product of the above transesterification or esterification at a temperature of 200° to 270° C. in an evacuated system until a desired degree of polymerization is attained while continuously removing 1,4-butanediol and by-products. The catalyst for the transesterification or esterification can be used as such in the polycondensation to attain a practically acceptable reaction rate. Alternatively, one or more of the compounds described above as the catalyst for the transesterification or esterification may be additionally added prior to the initiation of the polycondensation for the purpose of enhancing the polycondensation rate. Furthermore, a stabilizer such as a hindered phenol or phosphorus compound may be added in the monomer preparation step or the polymerization step and the use of such a stabilizer in a proper amount is favorable to further enhance the effects of the present invention. The introduction of the aromatic sulfonic acid compound (C) will have little affect on the rate of the melt-phase polycondensation and will thus not be a hinderance, provided that the amount of the compound (C) which is introduced is within the range as defined herein.

The modified polyester prepared by the melt polymerization under the above conditions is one having an intrinsic viscosity of between 0.5 to 1.2 dl/g in o-chlorophenol at 25° C., which is then solidified by cooling and thereafter pulverized or granulated. Since it is preferred that a polyester for packaging material have a high degree of polymerization, the modified polyester may be subjected to solid-state polymerization depending upon its intended end-use application. The solid-state polymerization thereof may be conducted by conventional processing techniques. That is, solid state polymerization can be conducted by transferring finely divided pellets of the modified polyester to a reactor fitted with a suitable gas inlet, an exhaust vent, a vacuum connector and the like, whereby the divided pellets are maintained at a temperature 5° to 60° C. lower than the melting point of the polyester either in an inert gas stream or in a vacuum. The reactor may be either a batch-type or a continuous-type and the desired degree of polymerization can be attained by suitably controlling the residence time and treatment temperature.

The modified polyester must contain, after the melt polymerization or the solid-state polymerization (if conducted), one or more compounds represented by the general formula (1) in such an amount as to satisfy not only the above formula (2) but also the following formula (3):

$$2 \leq (x/CEG) \times 100 \leq 150 \, (\%) \tag{3}$$

In the above general formula (3), x represents the amount of the aromatic sulfonic acid introduced and CEG represents the amount of the carboxyl end groups, which are each expressed in milliequivalent per kilogram (meq/kg) of the polymer. It is particularly preferable that the x/CEG ratio range from 3 to 120%. When the ratio is lower than 2%, the amount of the decomposition gas evolved during long-term use at high temperature, such as tetrahydrofuran, or the amount of the sublimate generated in a molten state will not be significantly reduced. On the other hand, when it exceeds 150%, not only will the amount of decomposition products not be significantly reduced, but also the obtained polyester will exhibit poor mechanical properties (such as elongation and tenacity) owing to the polyester's low degree of polymerization. In other words, the objective effects of the present invention can be sufficiently exhibited only when the above ratio is within the specific range defined by the above formulas (2) and (3).

In the present invention, the amount of the aromatic sulfonic acid compound introduced (i.e., x) and the amount of the carboxyl end groups (i.e, CEG) must be controlled such that each is within the specific ranges as to satisfy the formulas (2) and (3). The former is nearly equal to the value calculated from the amount of the compound fed in the preparation of the polyester as will be described below, so that it can be easily controlled.

On the other hand, the latter can be controlled by suitably selecting the conditions of the melt polymerization or the solid-sate polymerization. That is, a polyester satisfying the requirements of the present invention can be prepared by controlling the polymerization temperature, temperature rise rate, polymerization time, degree of vacuum, evacuation rate, kind and amount of the catalyst and kind and amount of the additive in the melt polymerization, and the polymerization temperature, temperature rise rate, degree of vacuum, evacuation rate, flow rate of stream, residence time, kind and amount of the catalyst and kind and amount of the additive in the solid-sate polymerization.

If necessary, the polyester of the present invention may be mixed with one or more members selected from among other thermoplastic resins, additives and organic and inorganic fillers, and used as a composition through melt kneading, so far as the benefits achieved by the present invention are not deleteriously affected.

Examples of thermoplastic resins that may be mixed with the polyester of the present invention include polyester elastomers, polyester resins (other than those of the present invention), polyolefin resin, polystyrene resins, polyamide resins, polycarbonates, polyacetals, polyarylene oxides, polyarylene sulfides and fluororesins.

Examples of optional additives include conventional stabilizers such as ultraviolet absorbers, and antioxidants, antistatic agents, flame retardants, auxiliary flame retardants, colorants such as dyes and pigments, lubricants, plasticizers, slip additives, mold release agents and nucleating agents.

Examples of inorganic fillers include glass fibers, milled glass fibers, glass beads, glass flakes, silica, alumina fibers, zirconia fibers, potassium titanate ffibers, carbon fibers, carbon black, graphite, silicates such as calcium silicate, aluminum silicate, kaolin, talc and clay; metal oxides such as iron oxide, titanium oxide, zinc oxide, antimony oxide and alumina; carbonates and sulfates of metals such as calcium, magnesium and zinc, silicon carbide, silicon nitride and born nitride, Examples of organic fillers include hig-melting aromatic polyesters, liquid-crystal polyesters, aromatic polyamides, fluororesin, and polyimide fibers.

Electrical or electronic parts and automobile parts are often required to exhibit exceptional flame retardance depending upon its conditions of use so that among the above-noted optional components, a flame retardant and an auxiliary flame retardant are particularly frequently added to the polyester as one possible essential component. The flame retardants usable in this case include known halogen-containing flame retardants such as brominated polycarbonates, brominated epoxy compounds, brominated diphenyl and brominated diphenyl ethers, while the auxiliary flame retardants include antimony compounds such as antimony trioxide, antimony pentaoxide and antimony halides; compounds of metals such as zinc and bismuth; magnesium hydroxide and clay silicate such as asbestos. The use of a proper amount of a stabilizer such as an antioxidant is effective to further enhance the effects of the present invention.

As described above, the modified polyester of the present invention exhibits excellent mechanical properties such as elongation and tenacity. In addition, the modified polyester of this invention evolves significantly reduced amounts of decomposition gas during long-term use at high temperatures, such as tetrahydrofuran, as well as reduced amounts of sublimate which is generated in a molten state. Thus, the polyester of this invention does not pollute the working atmosphere during molding and minimally stains or erodes molds and associated equipment. Furthermore, electrical or electronic parts (such as relays, switches or connectors) produced by molding the modified polyester of this invention or a composition including the same are particularly advantageous since metal contacts and other ancillary metallic parts are not stained or corroded which could result in malfunctions. When the modified polyester resin of this invention or a composition including the same is used as packaging material (such as a film, sheet or container) for food, drink or cosmetics, the odor or taste of the contents is not impaired. Thus, the modified polyester of the present invention is a material having numerous potential uses.

The present invention will be described further by the following non-limiting Examples.

EXAMPLES

In the Examples, the characteristics were determined by the following methods:

(1) Determination of Amount of Gas Evolved

As ASTM No. 1 tensile test piece was prepared by injection molding, pulverized and then used as a sample. 5 grams of such a sample were allowed to stand in a 20-ml head space at 150° C. for one hour to determine the amount of gas evolved by gas chromatography. The weight of the evolved gas was expressed in ppm based on the weight of the sample. The conditions of measurement were as follows:

equipment: HP5890A mfd. by Yokogawa-Hewlett-Packard, Ltd., column: HR-1701, 0.32 mm $\phi \times 30$ m, column temperatures:

50° C. (one min)—5° C./min–250° C. (one min), and detector: FID.

The molding of the test piece was conducted under the following conditions:

molding machine: IS30EPN mfd. by Toshiba Corporation.

cylinder temperatures:

260° C. (nozzle)—250° C. (third zone)—240° C. (second zone)—240° C. (first zone)

but in Example 8 and Comparative Example 8,

265° C. (nozzle)—255° C. (third zone)—250° C. (second zone)—250° C. (first zone), mold temperature: 60° C., and screw speed: 160 rpm.

(2) Determination of Melt-Heating Loss 10 milligrams of a sample as described above were melted at 255° C. in an air flow for 30 minutes to determine weight loss with a thermogravimetric analyzer (TGA-7 mfd. by Perkin Elmer).

(3) Determination of Amount of Carboxyl End Groups

The amount of carboxyl end groups (CEG) was determined by dissolving a sample as described above in benzyl alcohol kept at 215° C. in 10 minutes and titrating the obtained solution with a 0.01N aqueous solution of sodium hydroxide.

(4) Determination of Amount of Sulfonate Salt Introduced

The amount of the sulfonate salt introduced was determined by measuring the alkali metal content by fluorescent X-ray analysis and was expressed in milliequivalent per kilogram (meq/kg) of the polymer. It has been ascertained that the amount thus determined is nearly equal to the value calculated from the amount of the salt fed in the preparation of the polyester.

(5) Determination of Tensile Elongation

Tensile elongation at room temperature (23° C.) was examined with an ASTM No. 1 tensile test piece which was molded under the same conditions as those described in the item (1). The average tensile elongation of ten pieces is given in Tables.

EXAMPLES 1 TO 4 AND COMPARATIVE EXAMPLES 1 TO 5

220.3 parts by weight of dimethyl terephthalate, 153.2 parts by weight of 1,4-butanediol, sodium 4-(2-hydroxyethoxy)benzenefulfonate (I-a) (in a variable amount) and 0.14 part by weight (80 ppm in terms of titanium based on the polymer) of titanium tetrabutoxide were fed into a reactor fitted with an agitator and a distilling column. The resulting reaction system was fully purged with nitrogen and the contents were heated to 160° C. under normal pressure, followed by the initiation of agitation. The temperature of the contents was gradually raised to distill away the methanol formed as a by-product. When the amount of the methanol distilled away exceeded 90% by weight of the theoretical amount, the temperature of the contents reached 210° C. The reaction mixture was transferred to another reactor and the pressure of this system was reduced to 0.1 Torr in one hour, while the temperature of the contents was raised up to 240° to 260° C. The contents were agitated in a vacuum of 0.1 Torr for about 2.5 to 3 hours and the resulting melt was extruded through a nozzle as a strand, which was cooled with water, freed from water by passing it through hot air, and pelletized.

The intrinsic viscosity of the polyester thus prepared was determined in o-chlorophenol at 25° C. and the above characteristics thereof were determined. In the determination of the amount of gas evolved, four kinds of gases, i.e., 1-butene, acrolein, tetrahydrofuran and 3-butene-1-ol were detected. The results are given in Table 1. For comparison, a polyester prepared without using any aromatic sulfonic acid compound (Comparative Example 1), polyesters wherein the amount of the salt (I-a) introduced is outside the range according to the present invention (Comparative Examples 2 and 5) and polyesters wherein the ratio of the amount of the salt (I-a) introduced to the amount of the carboxyl end groups is outside the range defined by the above formula (3) (Comparative Examples 1 to 5) were also evaluated in the same manner as that described above. The results are also given in Table 1.

A switch-shaped test piece having a metal terminal inserted thereinto was prepared by insert molding using the same pelletized polybutylene terephthalate as that used above and allowed to stand in a hermetically sealed container at 150° C. for one month. The resulting metal terminal was observed with the naked eye to evaluate its surface gloss. The metal terminals of the test pieces prepared from the polyesters of Examples 1 to 4 little tarnished, while those prepared from the polyesters of Comparative Examples 4 and 5 somewhat tarnished and those prepared from the polyesters of Comparative Examples 1 to 3 remarkably tarnished.

EXAMPLES 5 TO 7 AND COMPARATIVE EXAMPLES 6 AND 7

Modified polybutylene terephthalates were prepared by melt polymerization in the same manner as that of the Example 2 except that the sodium 4-(2-hydroxyethoxy)benzenesulfonate (I-a) was replaced by sodium 4-(2-hydroxypropoxy)benzenesulfonate (I-b), sodium 4-(2-hydroxyethoxyethoxy)benzenesulfonate (I-c) or sodium 2-(2-hydroxyethoxy)naphthalene-6-sulfonate (I-d). The results are given in Table 2. Polybutylene terephthalates for comparison were also prepared by using methylbenzenesulfonic acid (I'e) or dimethyl sodium sulfophthalate (I'-f) which is different from the compound represented by the general formula (1) in respect of structure, and evaluated in a similar manner to that described above. The results are given in Table 2.

EXAMPLES 8 AND COMPARATIVE EXAMPLE 8

220.3 parts by weight of dimethyl 2,6-naphthalenedicarboxylate, 153.2 parts by weight of 1,4-butanediol, 0.27 parts by weight of sodium 4-(2-hydroxyehtoxy)benzenesulfonate and 0.14 parts by weight (80 ppm in terms of titanium based on the polymer) of titanium tetrabutoxide were fed into a reactor fitted with an agitator and a distilling column. The resulting reaction system was fully purged with nitrogen and the contents were heated to 160° C. under normal pressure, followed by the initiation of agitation. The temperature of the contents was gradually raised to distill the methanol formed as a by-product. When the amount of the methanol distilled away exceeded 90% by weight of the theoretical amount, the temperature of the contents reached 210° C. The reaction mixture was transferred to another reactor and the pressure of this system was reduced to 0.1 Torr in one hour, while the temperature of the contents was raised up to 260° C. The contents were agitated in a vacuum of 0.1 Torr for 2.0 hours and the resulting melt was extruded through a nozzle as a strand. This strand was cooled with water, freed from water by passing it through hot air, and pelletized.

The intrinsic viscosity of the polymer thus prepared was determined in o-cholorphenol at 25° C. and the above characteristics thereof were also determined. In the determination of the amount of gas evolved, four kinds of gases, i.e., 1-butene, acrolein, tetrahydrofuran and 3-butene-1-ol were detected. The results are given in Table 3. For comparison, another polybutylene naphthalate was prepared without using any aromatic sulfonic acid compound and evaluated in the same manner as that described above. The results are also given in Table 3.

TABLE 1

| | Arom. sulfonic acid | | | Intrinsic | Amt. of gas evolved (ppm) | | | | melt-heating | tensile |
| | kind | amt. introduced (meq/kg) | $\frac{x}{[CEG]} \times 100(\%)$ | viscosity (dl/g) | 1-butene | acrolein | tetra-hydrofran | 3-buten-1-ol | loss (%) | elongation (%) |
|---|---|---|---|---|---|---|---|---|---|---|
| Comp. 1 | — | — | — | 0.78 | 0.08 | 0.79 | 184.40 | 0.88 | 1.23 | 25 |
| Ex. 2 | I-a | 0.1 | 0.3 | 0.78 | 0.07 | 0.77 | 163.11 | 0.87 | 1.16 | 25 |
| 3 | I-a | 1 | 1.4 | 0.77 | 0.08 | 0.77 | 108.66 | 0.84 | 1.20 | 90 |
| Ex. 1 | I-a | 1 | 3.2 | 0.78 | 0.04 | 0.55 | 38.42 | 0.66 | 0.84 | 92 |
| 2 | I-a | 5 | 16.7 | 0.77 | 0.04 | 0.52 | 29.36 | 0.64 | 0.64 | 172 |
| 3 | I-a | 10 | 31.3 | 0.77 | 0.04 | 0.50 | 27.22 | 0.60 | 0.60 | 168 |
| 4 | I-a | 75 | 105.6 | 0.74 | 0.02 | 0.50 | 24.32 | 0.61 | 0.43 | 112 |
| Comp. 4 | I-a | 75 | 195.1 | 0.76 | 0.04 | 0.50 | 89.44 | 0.63 | 0.62 | 110 |
| Ex. 5 | I-a | 150 | 298.4 | 0.63 | 0.07 | 0.53 | 96.33 | 0.80 | 1.04 | 20 |

TABLE 2

| | Arom. sulfonic acid | | | Intrinsic | Amt. of gas evolved (ppm) | | | | melt-heating | tensile |
| | kind | amt. introduced (meq/kg) | $\frac{x}{[CEG]} \times 100(\%)$ | viscosity (dl/g) | 1-butene | acrolein | tetra-hydrofran | 3-buten-1-ol | loss (%) | elongation (%) |
|---|---|---|---|---|---|---|---|---|---|---|
| Ex. 2 | I-a | 5 | 16.7 | 0.77 | 0.04 | 0.52 | 29.36 | 0.64 | 0.64 | 172 |
| 5 | I-b | 5 | 18.9 | 0.76 | 0.02 | 0.52 | 31.38 | 0.55 | 0.69 | 180 |
| 6 | I-c | 5 | 20.0 | 0.77 | 0.02 | 0.50 | 37.46 | 0.54 | 0.69 | 171 |
| 7 | I-d | 5 | 17.1 | 0.78 | 0.04 | 0.53 | 34.02 | 0.63 | 0.59 | 174 |
| Comp. 6 | I'-e | 5 | 13.4 | 0.80 | 1.01 | 0.79 | 224.38 | 0.99 | 1.31 | 25 |
| Ex. 7 | I'-f | 5 | 16.9 | 0.75 | 0.09 | 0.83 | 194.36 | 0.88 | 1.08 | 75 |

TABLE 3

| | Arom. sulfonic acid | | | Intrinsic | Amt. of gas evolved (ppm) | | | | melt-heating |
| | kind | amt. introduced (meq/kg) | $\frac{x}{[CEG]} \times 100(\%)$ | viscosity (dl/g) | 1-butene | acrolein | tetra-hydrofran | 3-buten-1-ol | loss (%) |
|---|---|---|---|---|---|---|---|---|---|
| Ex. 8 | I-a | 5 | 17.1 | 0.81 | 0.04 | 0.49 | 33.02 | 0.49 | 0.59 |
| Comp. Ex. 8 | — | — | — | 0.81 | 0.09 | 0.80 | 246.08 | 0.98 | 1.10 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A modified polyester resin which is the reaction product of:
   (A) an acid component comprised of terephthalic acid, 2,6-naphthalene dicarboxylic acid or a dimethyl ester thereof,
   (B) a diol component comprising an alkylene glycol having 2 to 8 carbon atoms, and
   (C) an aromatic sulfonic acid compound of the following general formula (1):

$$HO(RO)_n-Ar-SO_3M \qquad (1)$$

wherein Ar represents a benzene or naphthale ring, n represents an integer from 1 to 10, R represents a group selected from among alkylenes having 2 or 3 carbon atoms and when n is 2 or more, R may be the same as or different from one another, and M represents an alkali metal selected from lithium, sodium and potassium, and wherein the modified polyester satisfies the following formulas and:

$$(2) \quad 0.25 \leq x \leq 100 \text{ (meq/kg)} \qquad (2)$$

$$(3) \quad 2 \leq (x/CEG) \times 100 \leq 150 \text{ (\%)} \qquad (3)$$

where x represents the amount of the aromatic sulfonic acid compound represented by the above general formula (1) introduced thereinto and CEG represents the amount of the carboxy end groups, and x and CEG are each expressed in milliequivalent per kilogram (meq/kg) of the polymer.

2. The modified polyester according to claim 1, wherein the alkylene glycol B having 2 to 8 carbon atoms comprises 1,4-butanediol.

3. The modified polyester according to claim 1 or 2, wherein the polyester is a copolyester containing one or more comonomers of components (A) and (B) in an amount of at most 30 mole % based on all the repeating ester units.

4. The modified polyester according to claim 3, wherein the polyester is a copolyester containing one or more comonomers of components (A) and (B) in an amount of at most 20 mole %, based on all the repeating ester units.

5. A modified polyester according to claim 1 or 2, wherein x in formula (2) is between 0.5 and 50 meq/kg.

6. A modified polyester according to claim 1, wherein $3 \leq (x/[CEG]) \times 100 \leq 120(\%)$.

7. A molded electric or electronic component consisting essentially of the modified polyester according to claim 1.

8. A film, sheet or container which consists essentially of the modified polyester according to claim 1.

9. A method of manufacturing a modified polyester comprising subjecting the following comonomers to catalytic polyester reaction conditions:
   (A) an acid component comprising terephthalic acid, (B) a diol component comprising an alkylene glycol having 2 to 8 carbon atoms, and (C) an aromatic sulfonic acid compound of the following general formula (1):

$$HO(RO)_n\text{—}Ar\text{—}SO_3M \qquad (1)$$

wherein Ar represents a benzene or naphthalene ring, n represents an integer from 1 to 10, R represents a group selected from among alkylenes having 2 or 3 carbon atoms and when n is 2 or more, R may be the same as or different from one another, and M represents an alkali metal selected from lithium, sodium and potassium, and satisfying the following formulas (2) and (3);

$$0.25 \leq x \leq 100 \text{ (meq/kg)} \qquad (2)$$

$$2 \leq (x/CEG) \times 100 \leq 150 \text{ (\%)} \qquad (3)$$

wherein x represents the amount of the aromatic sulfonic acid compound represented by the above general formula (1) introduced thereinto and CEG represents the amount of the carboxy end groups and x and CEG are each expressed in milliequivalent (meq/kg) per kilogram of the polymer.

10. A method according to claim 9, wherein the aromatic sulfonic acid component (C) is incorporated in the reaction mixture before completion of esterification or transesterification of said acid and diol components (A) and (B).

* * * * *